United States Patent
Sato et al.

(10) Patent No.: US 9,361,935 B2
(45) Date of Patent: Jun. 7, 2016

(54) CONTENT PUBLISHING SYSTEM, PUBLISHING METHOD FOR A CONTENT PUBLISHING SYSTEM, AND PUBLISHING TERMINAL

(75) Inventors: Yoshitake Sato, Suwa (JP); Shigeo Ikeda, Suwa (JP); Katsutoshi Terashima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1190 days.

(21) Appl. No.: 12/621,302

(22) Filed: Nov. 18, 2009

(65) Prior Publication Data
US 2010/0125796 A1    May 20, 2010

(30) Foreign Application Priority Data
Nov. 20, 2008  (JP) .................. 2008-296389

(51) Int. Cl.
*G06F 15/00*   (2006.01)
*G06F 15/173*  (2006.01)
(Continued)

(52) U.S. Cl.
CPC .......... *G11B 20/10* (2013.01); *G11B 20/00869* (2013.01); *G11B 2220/2537* (2013.01); *H04L 41/082* (2013.01); *H04L 41/0853* (2013.01); *H04L 41/22* (2013.01)

(58) Field of Classification Search
CPC ................. G11B 27/034; G11B 27/34; G11B 2220/2545; H04L 41/22; H04L 41/082; H04L 41/0853
USPC ......... 700/234; 705/26.1; 358/1.15; 715/733; 333/234
See application file for complete search history.

(56) References Cited

U.S. PATENT DOCUMENTS 5,008,875 A * 4/1991 Tomoda ............... G11B 27/028
                                                           369/85
5,392,265 A * 2/1995 Takezawa ............. G11B 19/02
                                                        369/47.23
(Continued)

FOREIGN PATENT DOCUMENTS

JP    2001-167356 A    6/2001
JP    2001-167357 A    6/2001
(Continued)

OTHER PUBLICATIONS

Carzaniga et al., Toward deeply adaptive societies of digital systems, 2009, Software Engineering—Companion Volume, 2009. ICSECompanion, . 31st International Conference on (978-1-4244-3495-4) 2009. p. 331-334 Source: IEEE Electronic.*

(Continued)

*Primary Examiner* — Jordany Nunez
(74) *Attorney, Agent, or Firm* — Kilpatrick Townsend & Stockton LLP

(57) ABSTRACT

A content publishing system, a publishing method for a content publishing system, and a publishing terminal provide a service that is particularly convenient for the customer. A content publishing system SY having a plurality of publishing terminals 204 that record and publish content information containing content on recording media has an order content input unit 610 enabling customers to input order content, a publishing terminal extraction unit 420 that extracts from among the plural publishing terminals 204 one or more publishing terminals 204 that can process the order content based on the order content, a calculation unit 550 that calculates the required time denoting the time required to publish the order content according to the order content for the extracted one or more publishing terminals 204, a display unit 620 that displays the calculated required times of the one or more publishing terminals 204, and an order terminal selection unit 630 for specifying the publishing terminal 204 to process the order from among the one or more publishing terminals 204 displayed. The content publishing system, a publishing method for a content publishing system, and a publishing terminal record content using the specified publishing terminal 204.

6 Claims, 14 Drawing Sheets

(51) Int. Cl.
*G11B 7/00* (2006.01)
*G06F 3/048* (2013.01)
*G11B 20/10* (2006.01)
*G11B 20/00* (2006.01)
*H04L 12/24* (2006.01)

(56) References Cited

U.S. PATENT DOCUMENTS

| | | | | |
|---|---|---|---|---|
| 5,680,379 | A * | 10/1997 | Ishida | G11B 19/02 369/47.33 |
| 5,734,719 | A * | 3/1998 | Tsevdos et al. | 700/234 |
| 5,963,916 | A * | 10/1999 | Kaplan | 705/7.29 |
| 6,011,758 | A * | 1/2000 | Dockes et al. | 1/1 |
| 6,208,612 | B1 * | 3/2001 | Miller | 369/30.19 |
| 6,341,907 | B1 * | 1/2002 | Katsuyoshi | 400/582 |
| 6,373,798 | B1 * | 4/2002 | Arai | G11B 19/02 369/30.2 |
| 6,600,868 | B2 * | 7/2003 | Tokashiki | G11B 27/002 386/230 |
| 6,947,356 | B1 * | 9/2005 | Becker | G11B 17/228 360/98.04 |
| 2001/0006499 | A1 * | 7/2001 | Hayashi | G11B 19/04 369/47.34 |
| 2002/0003941 | A1 * | 1/2002 | Hatae | G11B 27/034 386/294 |
| 2003/0165094 | A1 * | 9/2003 | Tseng | G11B 7/0045 369/47.3 |
| 2004/0028377 | A1 * | 2/2004 | Inakura | G11B 27/034 386/230 |
| 2004/0141718 | A1 * | 7/2004 | Miyagoshi | G11B 20/00007 386/232 |
| 2005/0019077 | A1 * | 1/2005 | Hatta et al. | 400/62 |
| 2005/0237872 | A1 * | 10/2005 | Nguyen et al. | 369/44.14 |
| 2005/0240958 | A1 * | 10/2005 | Nguyen et al. | 725/20 |
| 2006/0077472 | A1 * | 4/2006 | Yahata | G11B 27/034 358/296 |
| 2006/0176502 | A1 * | 8/2006 | Brownstein et al. | 358/1.15 |
| 2007/0174140 | A1 * | 7/2007 | Noonan et al. | 705/27 |
| 2008/0300996 | A1 * | 12/2008 | Fei et al. | 705/26 |
| 2009/0265251 | A1 * | 10/2009 | Dunlap et al. | 705/26 |

FOREIGN PATENT DOCUMENTS

| | | |
|---|---|---|
| JP | 2002-092731 A | 3/2002 |
| JP | 2002-123446 A | 4/2002 |
| JP | 2002-245272 A | 8/2002 |
| JP | 2005-063401 A | 3/2005 |
| JP | 2007-128130 A | 5/2007 |

OTHER PUBLICATIONS

Polloni, Chris, CD-ROM Publishing Pros and Cons, May 2, 2007, U.S. Department of the Interior, U.S. Geological Survey, http://woodshole.er.usgs.gov/staffpages/cpolloni/manitou/cdrom/cdpub.htm.*

* cited by examiner

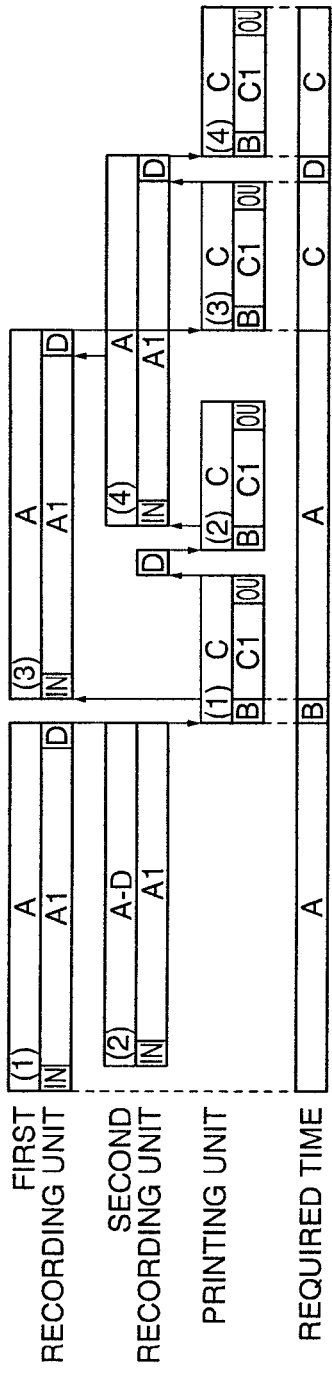

IN : TRANSPORTATION TIME TO RECORDING UNIT
A1 : RECORDING TIME
D : REMOVAL TIME FROM RECORDING UNIT
B : TRANSPORTATION TIME TO PRINTING UNIT
C1 : PRINTING TIME
OU : DISCHARGE TIME FROM PRINTING UNIT

A : RECORDING PROCESS TIME
    TRANSPORTATION TIME TO RECORDING UNIT (IN) + RECORDING TIME (A1) + REMOVAL TIME FROM RECORDING UNIT (D)

C : PRINTING PROCESS TIME
    TRANSPORTATION TIME (B) TO PRINTING UNIT + PRINTING TIME (C1) + DISCHARGE TIME (OU) FROM RECORDING UNIT

FIG. 7A

REQUIRED PRODUCTION TIME T1 WHEN PRODUCTION COUNT = n AND RECORDING UNIT COUNT = Drv $$(T1) = \text{int}((n+Drv-1) \div Drv) \times A$$
$$+ \text{int}((n+Drv-1) \div Drv-1) \times B$$
$$+ (Drv - n \% Drv) \times C$$
$$+ (Drv - 1 - n \% Drv) \times D \quad \cdots \text{(EQUATION 1)}$$

FIG. 7B

NUMBER OF DISCS TO PRODUCE BEFORE REQUEST Req
WAITING TIME Tw UNTIL PROCESSING REQUEST Req STARTS
WHEN nw = (TOTAL NUMBER OF DISCS PRODUCED FROM DISC 1 TO DISC Req) - (NUMBER OF DISCS COMPLETED)

If a recording unit is available (nw < Drv)

$$Tw = 0$$

If a recording unit is not available (nw ≥ Drv)

$$Tw = \text{int}((nw + Drv - 1) \div Drv) \times (A+B)$$

(EQUATION 2)

FIG. 7C

TIME UNTIL PROCESSING REQUEST Req IS COMPLETED (T2)

$$T2 = Tw + T1 \quad \text{(EQUATION 3)}$$

CONTENT PUBLISHING SYSTEM, PUBLISHING METHOD FOR A CONTENT PUBLISHING SYSTEM, AND PUBLISHING TERMINAL

CROSS-REFERENCES TO RELATED APPLICATIONS

This application claims priority under 35 U.S.C. §119 to Japanese Patent Application No. 2008-296389 filed on Nov. 20, 2008, the entire disclosure of which is expressly incorporated by reference herein.

BACKGROUND OF THE INVENTION

1. Technical Field

The present invention relates to a publishing terminal that records and publishes content information on a recording medium, to a content publishing system, and to a publishing method for such a content publishing system.

2. Related Art

Japanese Unexamined Patent Appl. Pub. JP-A-2007-128130 teaches an unmanned information terminal (referred to below as a "kiosk") that can record content information (referred to below as simply "content") on a recording medium and then print on the label side of the recording medium after receiving an order from a customer. Such kiosks typically require several ten minutes to complete the content recording and label printing operations, thus causing the customer to wait during this production period. Furthermore, even if the kiosk can accept order reservations, if a previous reservation has already been received, the waiting time increases accordingly.

It is conceivable to install plural kiosks in order to shorten the customer waiting time. In such a configuration, however, customers will typically prefer to submit their order to the kiosk with the shortest waiting time. However, which kiosk has the shortest waiting time is unknown until an order is actually entered into each kiosk. As a result, providing plural kiosks does not necessarily improve customer convenience.

It is also conceivable that a customer does not want to have the recording medium published at the time and location where the order is placed. For example, if such kiosks are installed in multiple train stations, a customer might enter a reservation at a kiosk in a station near their place of employment and want to pick up the completed recording medium at a station near home on the way home from work. For the customer, this configuration has the advantage of eliminating customer waiting time. For the kiosk (the side providing the publishing service), this also has the advantage of being able to effectively use idle time, that is, time when the terminal is not otherwise completing an order.

SUMMARY

A content publishing system and program for the same according to at least one embodiment of the present invention are directed to the foregoing problem and provide a service that is particularly convenient for the customer.

A first aspect of the invention is a content publishing system having a plurality of publishing terminals that record and publish content information containing content on recording media, including: an input unit to which order content is input; a publishing terminal extraction unit that extracts from among the plural publishing terminals a publishing terminal that can process the order content when order content is input to the input unit; a calculation unit that calculates at least one of an estimated production ending time and a required time denoting the time required to publish the order content on the publishing terminal extracted by the publishing terminal extraction unit; a display unit that displays the extracted publishing terminal and at least one of the required time and the estimated production ending time for the extracted publishing terminal; and a publishing terminal selection unit for selecting the publishing terminal to publish the order content from among the publishing terminals displayed on the display unit.

With this aspect of the invention the customer can specify the publishing terminal used to publish the order based on the required time, for example, from among the publishing terminals that can process the order because at least one of the estimated production ending time and the required time denoting the time required to publish the content information according to the order content are displayed for the publishing terminals that can publish the order content. As a result, when there are plural publishing terminals, the customer can select a publishing terminal with a short required time (waiting time), and convenience is good. This is also advantageous for the publishing terminal side (the side providing the content publishing service) because a plurality of publishing terminals can be operated efficiently.

In a content publishing system according to another aspect of the invention the publishing terminal has a plurality of recording units for recording the content information on recording media, and the calculation unit determines the recording media processing sequence by each of the plural recording units in the selected publishing terminal so that the concurrent processing time is increased or the idle times of the plural recording units are decreased, and calculates at least one of the estimated production ending time and the required time needed to publish the order content, when a plurality of recording media are to be produced based on the order content. When a plurality of recording media are to be produced based on the order content, this aspect of the invention enables producing the media efficiently in a shorter time.

In a content publishing system according to another aspect of the invention, the publishing terminal has a printing unit that can print the content information on either or both the recording medium and a recording medium accessory, and the calculation unit determines the recording media processing sequence by the recording unit and the printing unit in the selected publishing terminal so that the concurrent processing time of the recording unit and printing unit is increased or the idle times of the recording unit and printing unit are decreased, and calculates at least one of the estimated production ending time and the required time needed to publish the order content, when a plurality of recording media are to be produced based on the order content. When a plurality of recording media are to be produced, including printing on the label side, based on the order content, this aspect of the invention enables producing the media efficiently in a shorter time.

In a content publishing system according to another aspect of the invention the input unit enables inputting order content including a requested date and time, the content publishing system also includes an unprocessed information storage unit that stores unprocessed information for each of the plural publishing terminals denoting if the order content is being processed or has not been processed, and the publishing terminal extraction unit extracts the publishing terminal that can process the order content according to the order content including the requested date and time, and the unprocessed information for each publishing terminal stored in the unprocessed information storage unit.

With this aspect of the invention the customer does not need to wait (does not need to wait where the order was placed after placing an order) because the requested date and time can be specified. For the publishing terminal side, this aspect of the invention also has the advantage of enabling efficiently using idle time according to the order processing status.

The content publishing system according to another aspect of the invention preferably also has a location information storage unit that stores location information denoting the location of each of the plural publishing terminals, and the display unit also displays the location information of the extracted publishing terminal.

With this aspect of the invention the customer can specify a publishing terminal in a desired location based on the displayed location information (information identifying where the publishing terminal is located). More specifically, when there are plural publishing terminals in dispersed locations, the publishing terminal can be selected based on the desired location because the location information can be selected in addition to the estimated production ending time and required time.

In a content publishing system according to another aspect of the invention, the plural publishing terminals each have a printing unit that can print the content information on either or both the recording medium and a recording medium accessory, and the calculation unit calculates at least one of the required time and the estimated production ending time to include at least one of the time required for the printing unit to print on the recording medium and the time required to print on the accessory based on the order content.

This aspect of the invention enables the customer to obtain a product that is processed as desired, including a recording medium that contains not only the recorded content information but also has content printed directly thereon or printed on an accessory such as a jacket. The required time or estimated production ending time can also be calculated accurately to include the time required for the printing process.

In the content publishing system according to another aspect of the invention the input unit enables inputting order content including a printing requirement related to at least one of printing on the recording medium and printing on the accessory. The content publishing system also has an operating status information storage unit that acquires and stores information for each of the plural publishing terminals operating status information denoting whether each publishing terminal can execute the content information recording process and printing process, and the publishing terminal extraction unit extracts the publishing terminal that can process the order content from among the plural publishing terminals according to the order content including printing requirement information, and the operating status information of each publishing terminal stored in the operating status information storage unit.

This aspect of the invention enables selecting whether or not to print according to the customer's needs and wants. Furthermore, because the publishing terminal that can complete the publishing and printing processes is extracted according to the order content including printing requirements and operating status information, a publishing terminal that cannot print will not be selected if printing is required, for example.

Note that the operating status information includes information about whether or not the publishing terminal has a printing function. More specifically, if the plural publishing terminals include a publishing terminal that does not have a printing function, the publishing terminal extracted when printing is required will be extracted from among the group of publishing terminals not including the publishing terminals that do not have a printing function.

The recording medium is further preferably a disc-shaped recording medium. The invention can also be used with any common disc shaped recording medium.

Another aspect of the invention is a publishing method for a content publishing system that records content information including content to recording media, including steps of: inputting order content to an input unit; extracting by a publishing terminal extraction unit a publishing terminal that can process the order content from among a plurality of publishing terminals when order content is input to the input unit; calculating by a calculation unit at least one of an estimated production ending time and a required time denoting the time required to publish the order content on the publishing terminal extracted by the publishing terminal extraction unit; displaying by a display unit the extracted publishing terminal and at least one of the required time and the estimated production ending time for the extracted publishing terminal; selecting the publishing terminal to publish the order content from among the publishing terminals displayed on the display unit by a publishing terminal selection unit; and recording and publishing the content information by the selected publishing terminal.

With this aspect of the invention the customer can consider the required time, for example, and select a publishing terminal with a short required time from among the publishing terminals that can process the order. A plurality of publishing terminals can also be operated efficiently.

Another aspect of the invention is a publishing terminal that is connected to a host device and publishes recording media, including a control unit that controls receiving content information including content from the host device and publishing the content on the recording medium, a recording unit that records the content information on the recording medium, and a transportation unit that conveys the recording medium. The control unit calculating a recording time required by the recording unit to record the recording medium, and a transportation time required for the transportation unit to convey the recording medium, and sending at least one of the recording time and the transportation time based on a request from the host device.

With this aspect of the invention the host device connected to the publishing terminal can know, for example, the required time that is needed to publish the content information according to the customer order. As a result, when there are plural publishing terminals, the customer can select a publishing terminal with a short required time, and convenience is good. This is also advantageous for the publishing terminal side because a plurality of publishing terminals can be operated efficiently.

A publishing terminal according to another aspect of the invention also has a printing unit that can print the content information on either or both the recording medium and a recording medium accessory, and the control unit calculates the printing time required for printing by the printing unit based on the content information, and sends at least one of the recording time, transportation time, and printing time based on a request from the host device. This aspect of the invention enables the host device connected to the publishing terminal to know the required time needed to publish the content information, including printing, according to the order content of the customer.

A publishing terminal according to another aspect of the invention also has a plurality of recording units. The control unit in this aspect of the invention determines the recording media processing sequence by each of the plural recording units so that the concurrent processing time of the plural recording units is increased or the idle times of the plural recording units are decreased when a plurality of recording media are to be produced based on the content information, calculates the recording time and the transportation time of the plural recording media, and sends at least one of the transportation time and the recording time of the plural recording media based on a request from the host device. When plural recording media are to be produced based on the content information, this aspect of the invention enables producing the media efficiently in shorter time.

A publishing terminal according to another aspect of the invention also has a printing unit that can print the content information on either or both the recording media and a recording medium accessory. The control unit in this aspect of the invention determines the processing sequence of the plural recording media by the recording unit and the printing unit so that the concurrent processing time of the recording unit and printing unit is increased or the idle times of the recording unit and printing unit are decreased when a plurality of recording media are to be produced based on the content information, calculates the recording time, the transportation time, and the printing time of the plural recording media, and sends at least one of the printing time, the transportation time, and the recording time of the plural recording media based on a request from the host device. When plural recording media are to be produced, including printing, based on the content information, this aspect of the invention enables efficiently producing the recording media in shorter time.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 is a model describing the principle for calculating the required time.

FIG. 7 shows the algorithm for calculating the required time.

DESCRIPTION OF EMBODIMENTS

A content publishing system, a publishing method for a content publishing system, and a publishing terminal according to a preferred embodiment of the present invention are described below with reference to the accompanying figures.

A content publishing system according to at least of one embodiment of the invention records content information (information including content, referred to as "content" herein) on a recording medium and then prints on the label side of the recording medium based on a customer order. The content publishing system also calculates the required time, that is, the time required to complete the recording process and printing process and produce the recording medium, and displays the required time for the customer. The content publishing system according to at least of one embodiment of the invention is described below when deployed in retail stores such as the individual stores of a convenience store franchise. An optical disc is used by way of example as the recording medium.

Figure 1:
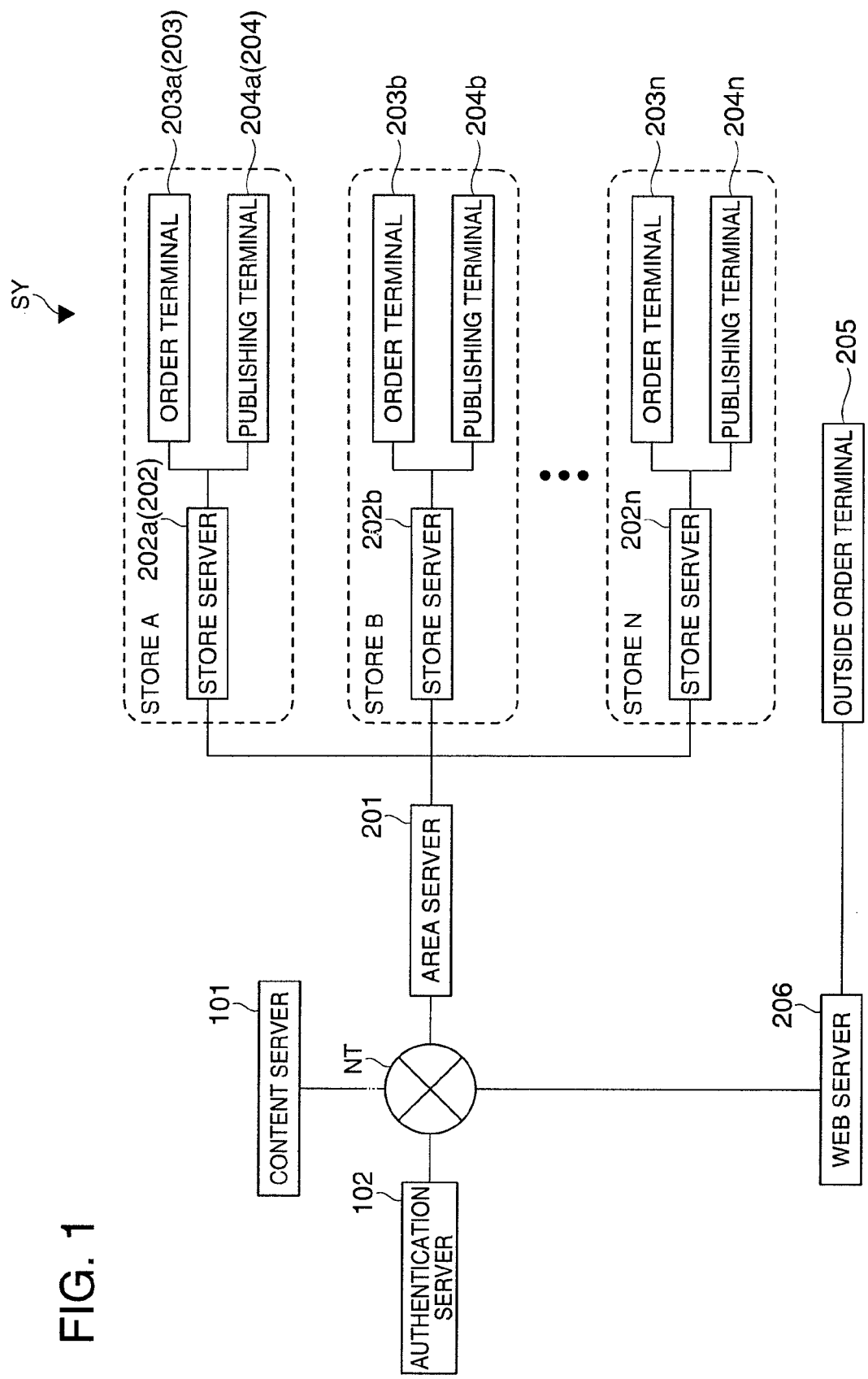
FIG. 1 is a block diagram showing the configuration of a content publishing system.

FIG. 1 is a block diagram showing the configuration of a content publishing system SY according to this embodiment of the invention. As shown in the figure the content publishing system SY includes one or more content servers 101 (only one shown in FIG. 1) that supply various types of content, such as video content and audio content, an area server 201 that is installed in the franchise headquarters, a group of store servers 202 (host devices, three store servers 202a, 202b, 202n shown in FIG. 1) that are installed in individual franchise stores, a group of order terminals 203 (three order terminals 203a, 203b, 203n shown in FIG. 1) and a group of publishing terminals 204 (three publishing terminals 204a, 204b, 204n shown in FIG. 1) that are used connected to the local store server 202, one or more outside order terminals 205 (one shown in FIG. 1) that are not located in a store), and a web server 206 that centrally manages the one or more outside order terminals 205. The one or more content servers 101, an authentication server 102, the area server 201, the one or more store servers 202, and the web server 206 are connected through the Internet or other network NT.

The content server 101 serves the content to be recorded to an optical disc D (see FIG. 2) and the label image to be printed on the label side of the optical disc D.

The optical disc D may be a DVD (Digital Versatile Disc), CD (Compact Disc), or other type of disc shaped recording medium.

The authentication server 102 serves the key (CSS key) used for descrambling (CSS descrambling) in a Content Scramble System (CSS) or other type of content encryption system (copy protection system).

The area server 201 centrally manages the store servers 202 connected thereto and the order terminals 203 and publishing terminals 204 that are connected thereto through the store server 202.

Store A is used for example below.

Store A has store server 202a, order terminal 203a, and publishing terminal 204a connected together over a LAN (local area network). The store server 202a is connected to the order terminal 203a and publishing terminal 204a over the LAN. The order terminal 203a is a terminal enabling customers to enter content orders, and is located inside the store. The publishing terminal 204a is a terminal for executing processes for recording and printing on an optical disc D, and then discharging the disc after these processes are completed (referred to below as the completed disc De shown in FIG. 2), and is located where a store employee is always present (such as behind the counter). The completed disc De discharged by the publishing terminal 204a is then inserted in a jacket and case, for example, by the store clerk, and is sold as a finished product.

The outside order terminal 205 may be a device such as a cell phone or personal computer owned by the customer, or a kiosk-type order entry terminal that is located away from the store, for example. The content publishing system SY according to this embodiment of the invention can thus accept orders through such an outside order terminal 205 and does not require the customer to physically visit a store to place an order.

The complete process executed by the content publishing system SY is described briefly next.

When a customer enters an order (including credit card transaction) from an outside order terminal 205, the web server 206 accessed by the outside order terminal 205 issues an authentication request to a credit card authentication server not shown operated by the credit card company. If the transaction is authorized, the web server 206 sends a publication request to the area server 201. If the customer enters an order (including transactions paid for by credit card, digital money, or cash) from an order terminal 203, a publication request is sent to the area server 201 through the store server 202.

Based on the order content input from the outside order terminal 205 or order terminal 203a, the area server 201 identifies the publishing terminal 204a to be used to process (produce) the order, and instructs the store server 202 to publish the disc. the area server 201 may also select a publishing terminal located in a different store instead of the publishing terminal 204a.

The store server 202a acquires the ordered content and the label printing image for that content from the content server 101, and acquires the CSS key for the ordered content from the authentication server 102.

The publishing terminal 204a acquires the content (the CSS descrambled content) and the label printing image from the store server 202a, and produces the completed disc De. The store clerk then packages the completed disc De in a sleeve and case, and exchanges the product for the corresponding order ticket. If the customer has requested that the product be shipped, the clerk ships the product to the specified address. Note, further, that if the order terminal 203a does not have a payment processing function, payment may be processed by the clerk before delivering the completed product to the customer.

Figure 2:
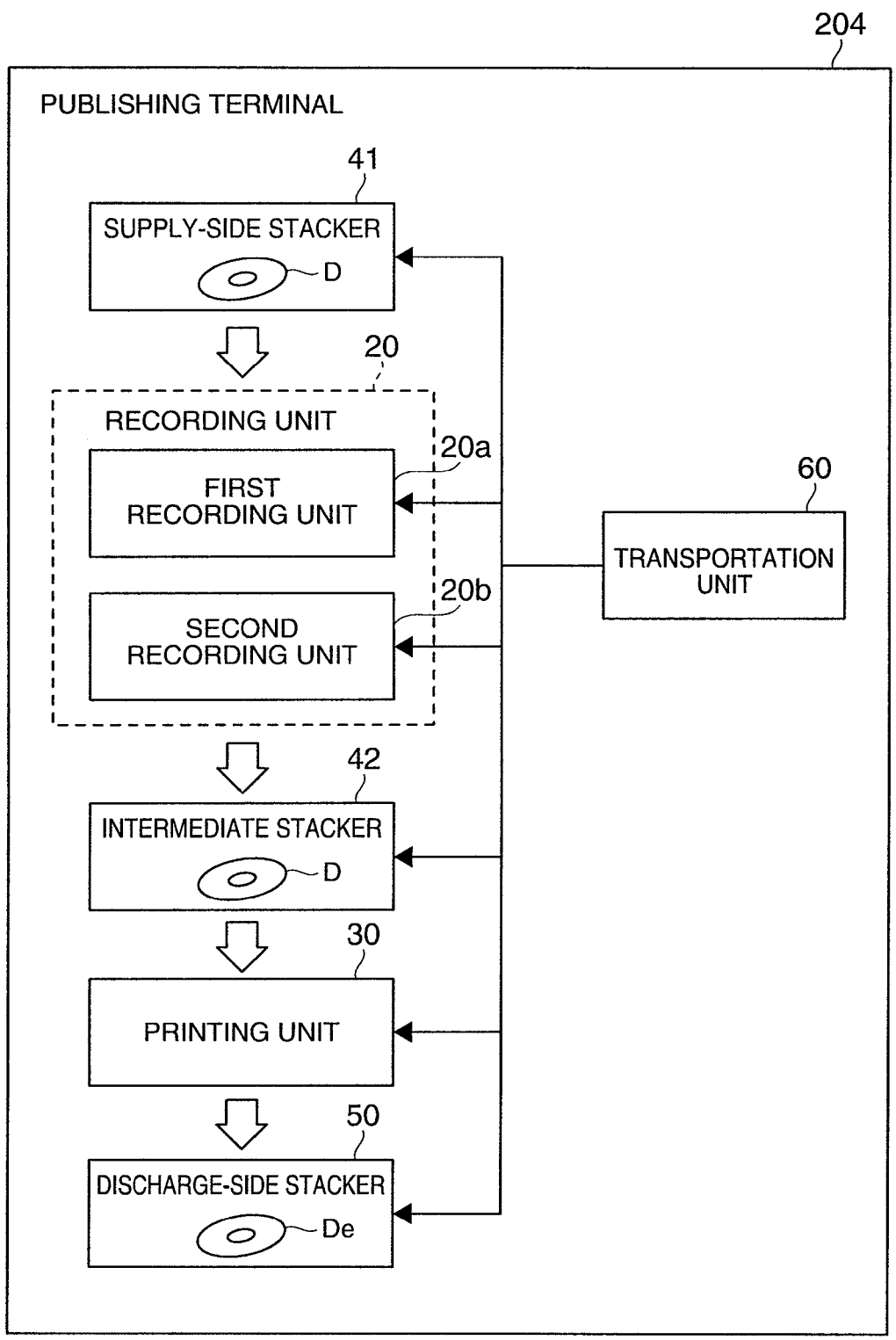
FIG. 2 is a simplified block diagram of a publishing terminal.
Figure 3:
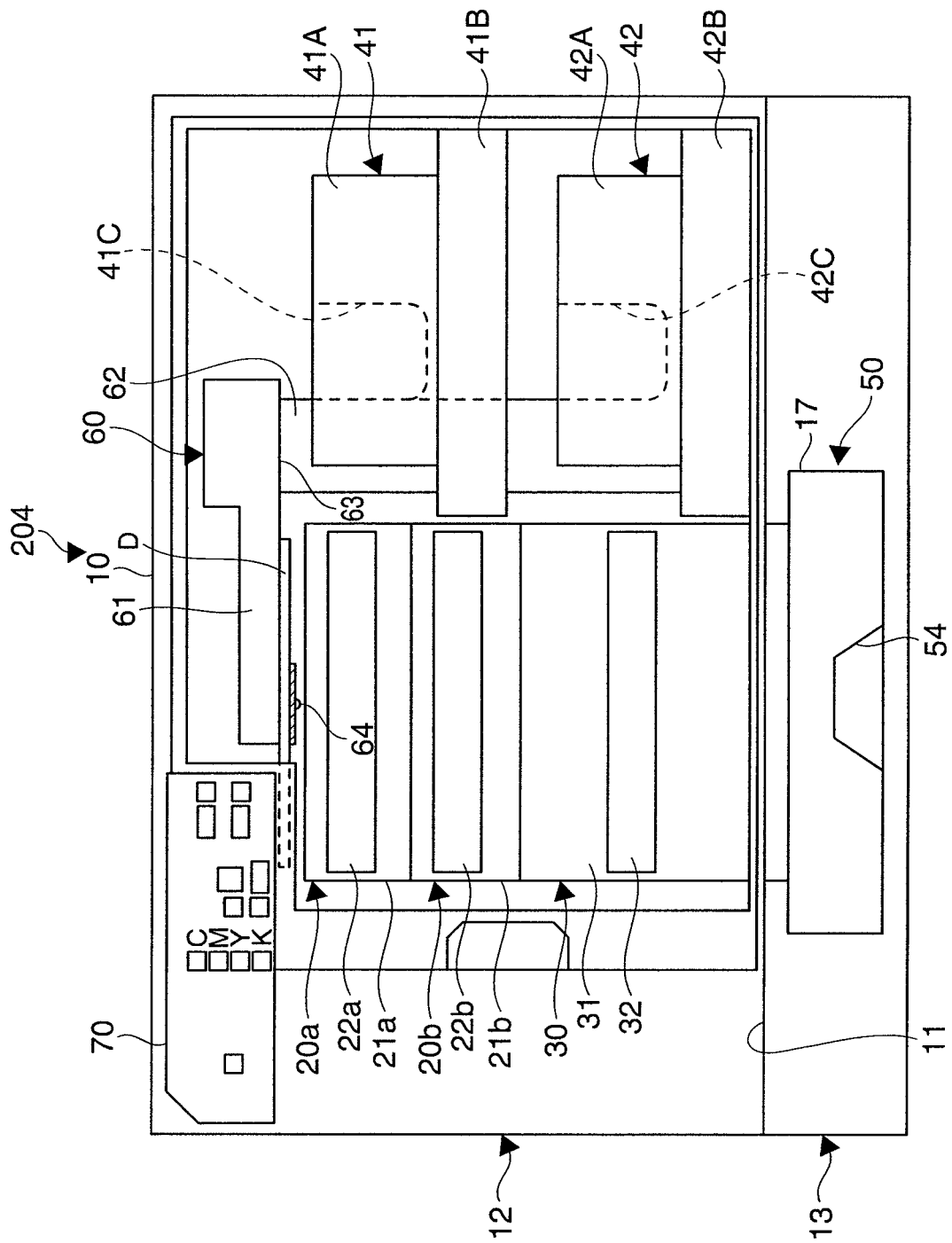
FIG. 3 is a front view of the publishing terminal.

The configuration of the publishing terminal 204 is described next with reference to FIG. 2 to FIG. 4. FIG. 2 is a simplified block diagram showing the general configuration of the publishing terminal 204 (204a). As shown in the figure the publishing terminal 204 includes a supply-side stacker 41, a recording unit 20 (first recording unit 20a, second recording unit 20b), intermediate stacker 42, printing unit 30, discharge-side stacker 50, and transportation unit 60.

The transportation unit 60 picks up and carries an optical disc D from the supply-side stacker 41 to the recording unit 20 (either first recording unit 20a or second recording unit 20b), and after recording is completed stores the optical disc D in the intermediate stacker 42 as needed. The transportation unit 60 also transports the optical disc D form the recording unit 20 (or intermediate stacker 42) to the printing unit 30, and after printing is completed conveys and stores the completed disc De from the printing unit 30 into the discharge-side stacker 50. Note that the printing unit 30 is an inkjet printing unit in this embodiment of the invention.

The configuration of the 20f (204a) is described in detail next with reference to FIG. 3 and FIG. 4. FIG. 3 is a front view of the publishing terminal 204 and FIG. 4 is a top view showing the inside of the publishing terminal 204 housing. As shown in FIG. 4 the housing 10 of the publishing terminal 204 is divided into a top housing 12 and a bottom housing 13 by a divider 11. A control unit 70, the first recording unit 20a, the second recording unit 20b, the printing unit 30, the transportation unit 60, the supply-side stacker 41, and the intermediate stacker 42 are disposed in the top housing 12.

The control unit 70 receives content and label printing images from the store server 202, controls the first recording unit 20a, second recording unit 20b, printing unit 30, and transportation unit 60 to record and print on the optical disc D and produce a completed disc De. A plurality of LEDs for indicating various aspects of the operating status (such as the power status, remaining ink level, stacker condition) of the publishing terminal 204 are also provided.

Figure 4:
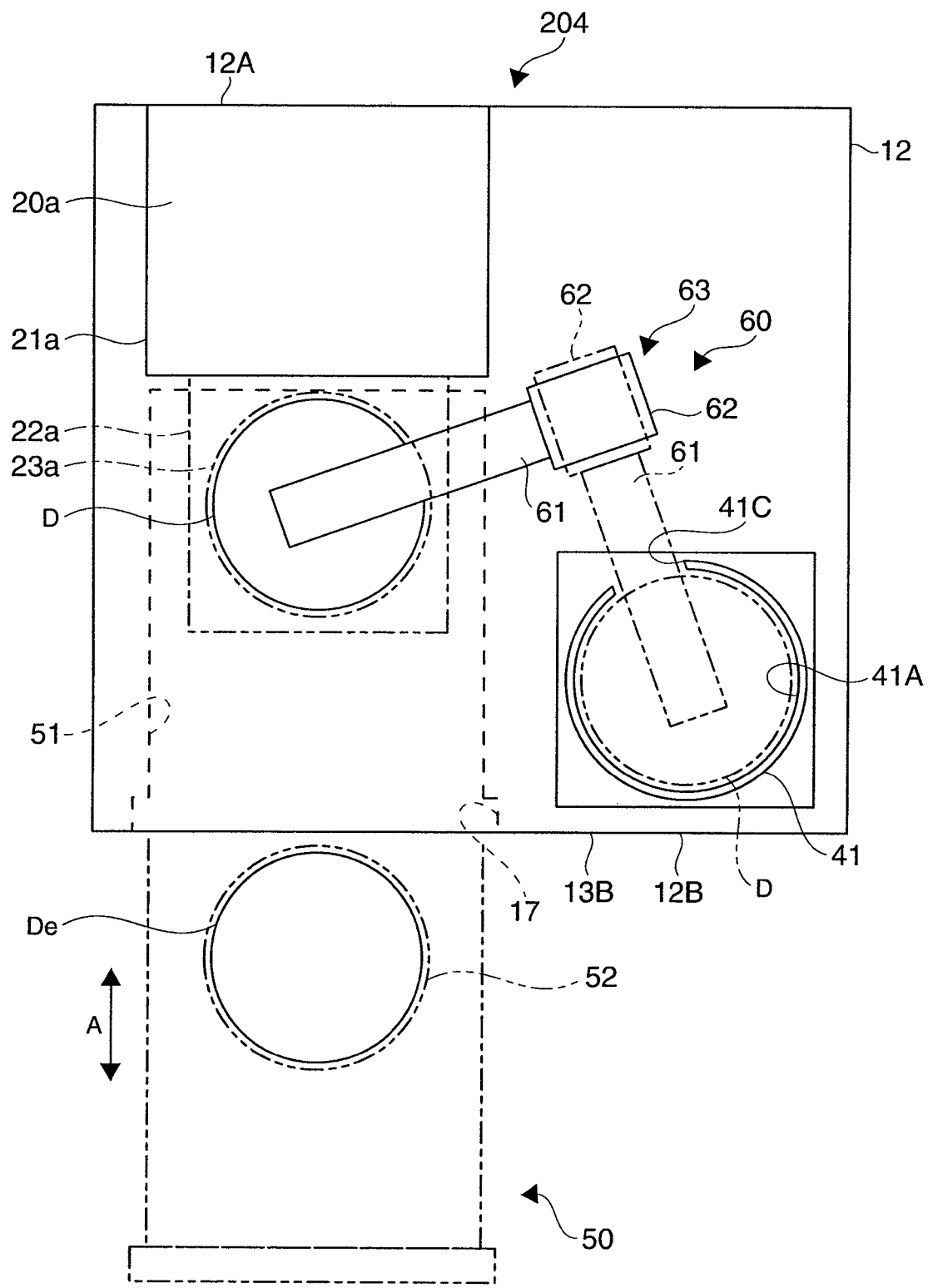
FIG. 4 is a top view of the publishing terminal.

The recording unit 20 and printing unit 30 are disposed one above the other at the back side 12A shown in FIG. 4, and the supply-side stacker 41 and intermediate stacker 42 are disposed one above the other at the front side 12B. A guide 62 that supports the arm 61 of the transportation unit 60 is disposed in a space located behind the supply-side stacker 41 and intermediate stacker 42.

The discharge-side stacker 50 is located below the space in front of the recording unit 20 and printing unit 30, or more specifically in the bottom housing 13. The discharge-side stacker 50 can move in and out (in the directions indicated by arrow A) freely through a drawer opening 17 formed in the front 13B of the bottom housing 13.

The first recording unit 20a and second recording unit 20b have a data recorder 21a, 21b and a drive tray 22a, 22b, respectively. The drive tray 22a, 22b is disposed to move freely in and out of the data recorder 21a, 21b, and has a substantially round recess 23a, 23b on which the optical disc D is carried.

The printing unit 30 has a printer 31 and a printer tray 32. The printer tray 32 is disposed to move freely in and out of the printer 31, and has a substantially round recess (not shown in the figure) on which the optical disc D is carried.

The transportation unit 60 includes the arm 61 unit, a cylindrical guide 62 that rises from the top of the divider 11, and a drive unit 63. The drive unit 63 can slide along the axial direction of the guide 62 (that is, vertically), and can pivot on the guide 62. The arm 61 moves circularly in conjunction with the pivoting action of the drive unit 63, and has on its distal end a handling unit 64 that grips the clamping area formed in the center of the optical disc D.

The supply-side stacker 41 has a tubular stacker holding unit 41A that stores several ten optical discs D in a stack, and a stacker base 41B that is attached to the housing 10 and enables freely installing and removing the stacker holding unit 41A. So that the arm 61 can descend to the bottom of the stacker holding unit 41A, a vertical notch 41C is formed in part of the outside wall of the stacker holding unit 41A.

The intermediate stacker 42 has substantially the same configuration as the supply-side stacker 41 (including a stacker holding unit 42A, stacker base 42B, and notch 42C). It should be noted that the publishing terminal 204 can be configured without the intermediate stacker 42 depending on the operating algorithm (see FIG. 6A). Note, further, that the intermediate stacker 42 may be used as the supply-side stacker, or it may be used as a stacker that stores optical discs D that are not completely processed.

The discharge-side stacker 50 has a stacker holding unit 51 that communicates with the drawer opening 17, a substantially round recess 52 in which plural completed discs De can be held in a stack in the stacker holding unit 51, and a gripping unit 54 for pulling out the discharge-side stacker 50 formed in the front of the discharge-side stacker 50.

The basic operation of this publishing terminal 204 is described next. Note that for brevity transportation from the recording unit 20 to the printing unit 30 does not involve the intermediate stacker 42.

When the publishing terminal 204 receives a production order from the store server 202, it starts operation of the transportation unit 60. When the handling unit 64 moves to the top of the stacker holding unit 41A of the supply-side stacker 41, the arm 61 descends passing through the notch 41C, and an optical disc D is picked from the stacker holding unit 41A by the handling unit 64. The drive tray 22 of the recording unit 20 (either first recording unit 20a or second recording unit 20b) is then pulled out. The transportation unit 60 then conveys the optical disc D to the drive tray 22, deposits the optical disc D in the recess 23, and then retracts to a specified retraction position. When the optical disc D is placed in the recess 23 of the drive tray 22, the drive tray 22 is pulled back into the data recorder 21 and the recording process starts.

When the recording process is completed in the recording unit 20, the drive tray 22 is pulled out. The handling unit 64 of the transportation unit 60 moves from the specified retraction position to the drive tray 22 and picks up the optical disc D. The drive tray 22 is then pulled inside the data recorder 21 and the printer tray 32 of the printing unit 30 is pulled out from the printer 31.

The handling unit 64 then moves to the printer tray 32 of the printing unit 30 while still holding the optical disc D, places the optical disc D in the recess of the printer tray 32, and then retracts to the specified retraction position. When the optical disc D is placed in the recess of the printer tray 32, the printer tray 32 is pulled into the printer 31 and the printing process starts.

When the printing process is completed by the printing unit 30, the printer tray 32 is pulled out, the handling unit 64 of the transportation unit 60 moves from the specified retraction position to the printer tray 32 and picks up the completed disc De. The printer tray 32 is then pulled into the printer 31, the handling unit 64 moves to above the discharge-side stacker 50 while holding the completed disc De, and then releases the disc to store (discharge) the completed disc De in the stacker holding unit 51 of the discharge-side stacker 50.

Figure 5:
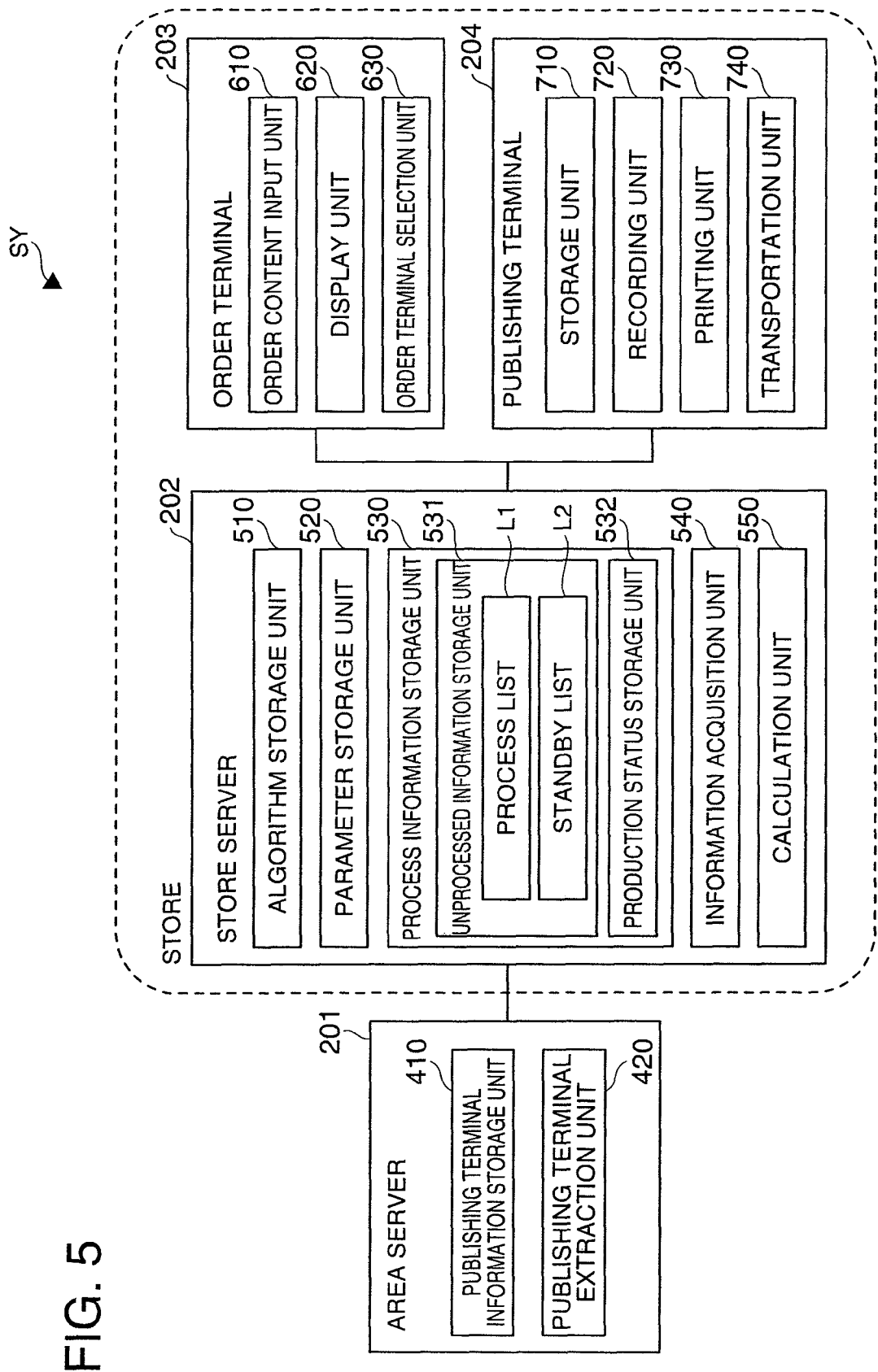
FIG. 5 is a function block diagram of the content publishing system.

The functional configuration of the content publishing system SY is described next with reference to FIG. 5. FIG. 5 is a block diagram showing the main functional configuration of the content publishing system SY.

The area server 201 has a publishing terminal information storage unit 410 and a publishing terminal extraction unit 420.

The publishing terminal information storage unit 410 stores operating status information for each publishing terminal 204 (204a, 204b, 204n) and location information identifying the production location as publishing terminal information (operating status information storage unit, location information storage unit).

The operating status information denotes for each publishing terminal 204 whether or not the terminal can execute the recording process and the printing process. Therefore, if the recording unit 20 malfunctions or the printing unit 30 runs out of ink, for example, the operating status information for the corresponding publishing terminal 204 is set to indicate that it cannot execute the recording process or the printing process, respectively. In addition, if the plural publishing terminals 204 managed by the area server 201 include a terminal without a printing unit 30 (a terminal having only the recording unit 20), the operating status information for that publishing terminal 204 is set to always indicate that the terminal cannot execute the printing process.

The location information denotes the location of each publishing terminal 204. The location information may store the name of the store, such as store A and store B, or other information identifying the location.

The publishing terminal extraction unit 420 extracts from among the plural publishing terminals 204 managed by the area server 201 one or more publishing terminals 204 that may be used to process an order based on the order content (publishing request) input from the order terminals 203 (203a, 203b, 203n). For example, if the order content includes a desired publication date and time, the publishing terminal extraction unit 420 acquires the unprocessed information relating to the optical discs D that are still not processed by the publishing terminals 204 from the store servers 202 (202a, 202b, 202n), compares this information with the requested date and time of the order, and finds a publishing terminal 204 that can process the order by the requested time. If the order content includes label printing (when the print request is set to print), a publishing terminal 204 that can execute the printing process is selected based on the operating status information of the publishing terminals 204 stored in the publishing terminal information storage unit 410.

The one or more publishing terminals 204 extracted by the publishing terminal extraction unit 420 are displayed on the display unit 620 of the order terminal 203 as candidates from which the customer can select the publishing terminal 204 used to process the order.

The functional configuration of the store server 202 (202a) is described next.

The store server 202 has an algorithm storage unit 510, a parameter storage unit 520, a process information storage unit 530, an information acquisition unit 540 and a calculation unit 550.

The algorithm storage unit 510 stores the algorithm (first algorithm, see equation (1) in FIG. 7) for calculating required time T1, which is the time required for the publishing terminal 204 (204a) to complete the completed disc De based on one publication request. The algorithm storage unit 510 also stores an algorithm for calculating required time T2, which is the time required to complete publication request Req (second algorithm, see equations (2) and (3) in FIG. 7).

Of the parameters (see FIG. 6B) required to calculate required time T1 and T2 using the foregoing algorithms, the parameter storage unit 520 stores the constant values. More specifically, the parameter storage unit 520 stores the transportation time IN to the recording unit 20, the removal time D from the recording unit 20, the transportation time B to the printing unit 30, and the discharge time OU from the printing unit 30.

The process information storage unit 530 includes an unprocessed information storage unit 531 and a production status storage unit 532.

The unprocessed information storage unit 531 stores as unprocessed information the publication requests to be processed by the corresponding publishing terminal 204 (that is, a publishing terminal 204 controlled by the store server 202). The unprocessed information is composed of two lists, a process list L1 containing an array of publication requests to be processed immediately, and a standby list L2 containing an array of publication requests to be processed during idle time.

Each publication request includes a production count n denoting the number of media to be produced, a recording mode, and a printing mode. These parameters are input in the order content.

When a request for unprocessed information is received from the area server 201, publication requests before the requested date/time are read from the process list L1 and standby list L2 and returned to the area server 201.

The production status storage unit 532 stores the production status of the optical disc D in the corresponding publishing terminal 204. The production status denotes production completed (processing completed), production started (production in progress, processing in progress), production to start, or not produced (not processed).

The information acquisition unit 540 acquires parameter identification information for identifying the parameters required to calculate required times T1 and T2. For example, the constant value parameters are read from the parameter storage unit 520 as part of the parameter identification information. Other parameter identification information is acquired from the process information storage unit 530, area server 201, and publishing terminal 204. While described in further detail below, the production count n, the unprocessed count nw, the recording unit 20 drive count Drv, the recording time A1, and the printing time C1 are required in addition to the foregoing constant parameters to calculate the required times T1 and T2.

The production count n is acquired from the area server 201 as part of the order content.

The unprocessed count nw can be determined from the production count n read from the process information storage unit 530.

The recording unit 20 drive count Drv changes according to the status of the publishing terminals 204. For example, if one of the two recording units 20a and 20b malfunctions, the drive count Drv is 1. Parameter identification information for determining the recording unit 20 drive count Drv is therefore acquired from the publishing terminal 204.

The recording time A1 and printing time C1 required to calculate required time T1 can be determined from the parameter identification information (recording mode and printing mode settings) acquired from the area server 201 as part of the order content. The recording mode and recording time A1 are stored with a 1:1 correlation in a table not shown. The printing mode and printing time C1 are similarly stored.

Note, further, that a configuration that reads the parameters other than the production count n and unprocessed count nw as constant values read from the parameter storage unit 520 is also conceivable. In this situation the recording mode and printing mode input as order content, and the operating status of the recording unit 20, are not used to calculate required times T1 and T2.

The calculation unit 550 calculates required times T1 and T2 based on the first algorithm and second algorithm stored in the algorithm storage unit 510, and the parameter identification information acquired by the information acquisition unit 540 (the parameters determined by the parameter identification information). The specific calculation method is further described below.

Note that the calculation unit 550 calculates the required times T1 and T2 of publishing terminals 204 that are controlled by the store server 202. More specifically, the calculation unit 550 of store server 202a calculates the required times T1 and T2 for publishing terminal 204a, and the calculation unit 550 of store server 202b calculates the required times T1 and T2 for publishing terminal 204b. (See FIG. 1.)

The functional configuration of the order terminal 203 (203a) is described next. The order terminal 203 has an order content input unit 610, a display unit 620, and an order terminal selection unit 630.

The order content input unit 610 is used by customers to input (or select) as order content the content name (content ID), production count n, requested date/time, whether printing is required (whether or not to print a label), the recording mode, and the printing mode.

The display unit 620 displays the required time T2 for each publishing terminal 204 calculated by the calculation unit 550 of the store server 202. The location of each publishing terminal 204 (such as the store name) is also displayed. The display unit 620 thus displays the location and the required time T2 correlated to each of the one or more publishing terminals 204 available for processing the order.

The order terminal selection unit 630 enables the customer to select from among the one or more publishing terminals 204 (production locations) displayed on the display unit 620 the publishing terminal 204 (production location) that will process the order. The actual disc production process will then be executed by the designated publishing terminal 204.

The order content input unit 610 and order terminal selection unit 630 of the order terminal 203 are rendered by a keyboard, operating buttons, or touch panel, for example. The display unit 620 is a liquid crystal display, for example. The order content input unit 610, display unit 620 and order terminal selection unit 630 may also be rendered using touch panels with a display function.

The functional configuration of the publishing terminal 204 (204a) is described next.

The publishing terminal 204 has a storage unit 710, a recording unit 720, a printing unit 730, and a transportation unit 740. The storage unit 710 stores the unprocessed optical discs D, and is rendered primarily by the supply-side stacker 41. The recording unit 720 records content on the optical discs D, and is rendered primarily by the recording unit 20. The printing unit 730 prints a label image on the label side of the optical disc D, and is rendered primarily by the printing unit 30. The transportation unit 740 conveys the optical discs D between the other processing stations of the publishing terminal 204, and is rendered primarily by the transportation unit 60.

Note, further, that the recording unit 720, printing unit 730, and transportation unit 740 are operated according to an operating algorithm corresponding to the calculation algorithm stored in the algorithm storage unit 510 of the store server 202.

A method whereby the calculation unit 550 calculates the required times T1 and T2 is described next with reference to FIG. 6 and FIG. 7. FIG. 6A is a model describing the principle for calculating the required time T1. FIG. 6B describes the symbols (parameters) used in the model shown in FIG. 6A. FIG. 7 shows the algorithm (equations) for calculating the required times T1 and T2.

The model shown in FIG. 6A describes producing four completed discs De in a publishing terminal 204 (204a) that has two recording units 20a and 20b, and one printing unit 30. The top row illustrates processing by the first recording unit 20a, and the second row illustrates processing by the second recording unit 20b. The third row shows processing by the printing unit 30, and the bottom row shows the required time T1.

The first to fourth optical discs D are denoted (1), (2), (3), and (4) indicating the order in which the discs are processed in FIG. 6A.

As shown in FIG. 6A, the required time T1 to produce four completed discs De is the sum of the recording process time A required to record the content on one optical disc D in the first recording unit 20a, the transportation time B required to convey the first optical disc D from the first recording unit 20a to the printing unit 30, the recording process time A required to record to the second (third of total number) optical disc D in the first recording unit 20a, the printing process time C required to print on the third optical disc D in the printing unit 30, the removal time D required to remove the second (fourth of total number) optical disc D from the second recording unit 20b, and the printing process time C required to print on the fourth optical disc D in the printing unit 30. This is expressed as equation (1) in FIG. 7A, and enables calculating the processing time (customer waiting time) for any one publication request.

$$T1=\text{int}((n+\text{Drv}-1)\div\text{Drv})\times A+\text{int}((n+\text{Drv}-1)\div\text{Drv}-1)\times B+(\text{Drv}-n\%\ \text{Drv})\times C+(\text{Drv}-1-n\%\ \text{Drv})\times D \quad (1)$$

Note that this equation (1) requires that
$A \geq C \times \text{Drv} + D \times (\text{Drv}-1)$ More specifically, the recording time A1 to one optical disc D must be longer than the printing time C1 of the number of discs processed by the recording units 20.

The control unit 70 of the publishing terminal 204 stores an algorithm such as shown in FIG. 6 in memory not shown. This algorithm is configured to sequence the processes executed by the first recording unit 20a, second recording unit 20b, and printing unit 30 based on the received content and label printing image so that the time spent concurrently processing the plural optical discs D is as long as possible, or so that the idle time of any recording unit or printing unit is as short as possible. This results in the shortest possible processing time. The control unit 70 controls recording and printing the received content and label printing image on the plural optical discs D in the sequence determined by this algorithm.

The times required for each process shown in FIG. 6A can be calculated on the publishing terminal 204 side. The control unit 70 receives the content and label printing image from the store server 202, and based on the received information calculates the recording time A1 of the first recording unit 20a and second recording unit 20b, the printing time C1 of the printing unit 30, the transportation time IN to the first recording unit 20a and second recording unit 20b of the transportation unit 60, the removal time D from the first recording unit 20a and second recording unit 20b of the transportation unit 60, the transportation time B to the printing unit 30 of the transportation unit 60, and the discharge time OU from the printing unit 30 of the transportation unit 60 for the particular optical disc D.

Based on these calculated times, the recording process time A, printing process time C, and the total time required to complete the recording process and printing process on the plural optical discs D can be calculated.

Based on a request command from the store server 202 or order terminal 203, the control unit 70 sends these calculated times as communication data.

The control unit 70 can also compute the equations shown in FIG. 7A, FIG. 7B, and FIG. 7C, and based on a request command from the store server 202 or order terminal 203 can output the calculated times T1, Tw, T2 as communication data.

The waiting time Tw required until processing a particular single request (request Req) (the "target request" below) starts is then calculated.

If the number of optical discs D to be produced before the target request is less than the number of recording units 20 (two in this embodiment of the invention), a recording unit 20 is available and the waiting time Tw is 0.

If the number of optical discs D to be produced before the target request is greater than or equal to the number of recording units 20, the waiting time Tw is, as shown in the model in FIG. 6A, the sum of the recording time A required to record one optical disc D in first recording unit 20a, the transportation time B required to convey the one optical disc D from the first recording unit 20a to the printing unit 30, the recording time A required to record the second (third of total number) optical disc D in the first recording unit 20a, and the transportation time B required to convey the second optical disc D from the first recording unit 20a to the printing unit 30. This is described by equation (2) in FIG. 7B.

$$Tw=\text{int}((nw+\text{Drv}-1)\div\text{Drv})\times(A+B) \quad (2)$$

The time T2 required to complete processing a particular single request (request Req) is then calculated. This required time T2 can be calculated based on the foregoing equation (1) and equation (2) using equation (3) shown in FIG. 7C.

$$T2=Tw+T1 \quad (3)$$

Note that of the parameters shown in FIG. 6B, the IN parameter denoting the transportation time to the recording unit is the time from when the drive unit 63 starts driving until an optical disc D stored in the stacker holding unit 41A of the supply-side stacker 41 is picked, the handling unit 64 carries the picked optical disc D to the drive tray 22, places the optical disc D on the drive tray 22, and then retracts to the specified retraction position, and the drive tray 22 is pulled back into the data recorder 21.

The removal time D denoting the removal time from the recording unit is the time required for the handling unit 64 to move from the specified retraction position to the drive tray 22 and pick the optical disc D, and the drive tray 22 to be pulled back into the data recorder 21.

The transportation time B denoting the transportation time to the printing unit is the time required for the handling unit 64 to move to the printer tray 32 while holding the optical disc D, deposit the optical disc D on the printer tray 32 and retract to the specified retraction position, and for the printer tray 32 to be pulled back into the printer 31.

The recording time A1 includes the downloading time required to download the content from the content server 101, the opening and closing time required to open and close the drive tray 22, and the verification time required to verify the optical disc D.

The printing time C1 includes the drying time required for the ink to dry, and the opening and closing time required for the printer tray 32 to open and close.

Figure 8:
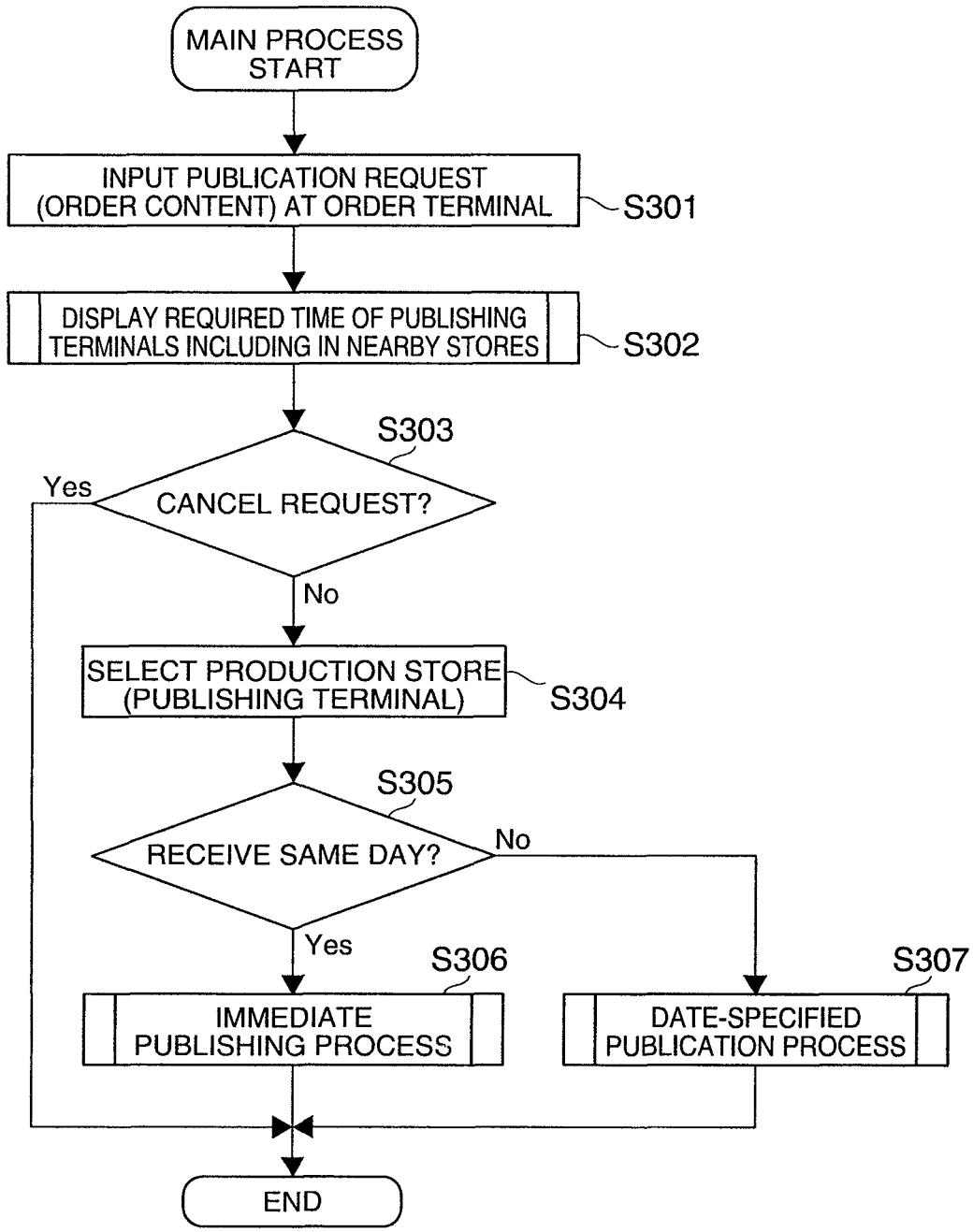
FIG. 8 is a flow chart showing the publishing process (main process) of the content publishing system.

The publishing process of the content publishing system SY is described next with reference to the flow charts in FIG. 8 to FIG. 11. FIG. 8 is a flow chart showing the steps of the main process.

As shown in the figure, when the customer inputs a publication request (order content including, for example, the content name, production count n, requested date/time, printing requirement, recording mode, and printing mode) to the order terminal 203 (or outside order terminal 205) (S301), the required times T2 (the time until processing the target request is completed) of the publishing terminals 204 located in the store where the order terminal 203 is located (the "ordering store" below) and nearby stores (S302, required time display process, shown in FIG. 9) are displayed.

Note that nearby stores as used here denotes stores (publishing terminals 204) that are part of the same franchise and are located within a radius of a specified distance from the ordering store. Alternatively, the required time T2 for all franchise stores may be displayed in step S302, or the customer may specify an area from which the displayed stores are selected. The required time T2 of the one or more publishing terminals 204 extracted by the publishing terminal extraction unit 420 (see FIG. 5) of the area server 201 is also displayed in step S302.

If the customer cancels the publication request (S303 returns Yes) after checking the required time T2 in the ordering store and nearby stores in S302, the process ends. If the request is not cancelled (S303 returns No), a production store (publishing terminal 204) is selected by the user (S304). Whether the order is to be picked up the same day is then determined (S305) based on the order content input in step S301. If the customer wants to pick up the order the same day (if the requested date/time is not input) (S305 returns Yes), the production process executes immediately (S306, immediate publishing process, see FIG. 10). If the customer does not want to pick up the order the same day (if the requested date/time is input) (S305 returns No), a date-specified publishing process executes (S307, date-specified publishing process, see FIG. 11).

Figure 9:
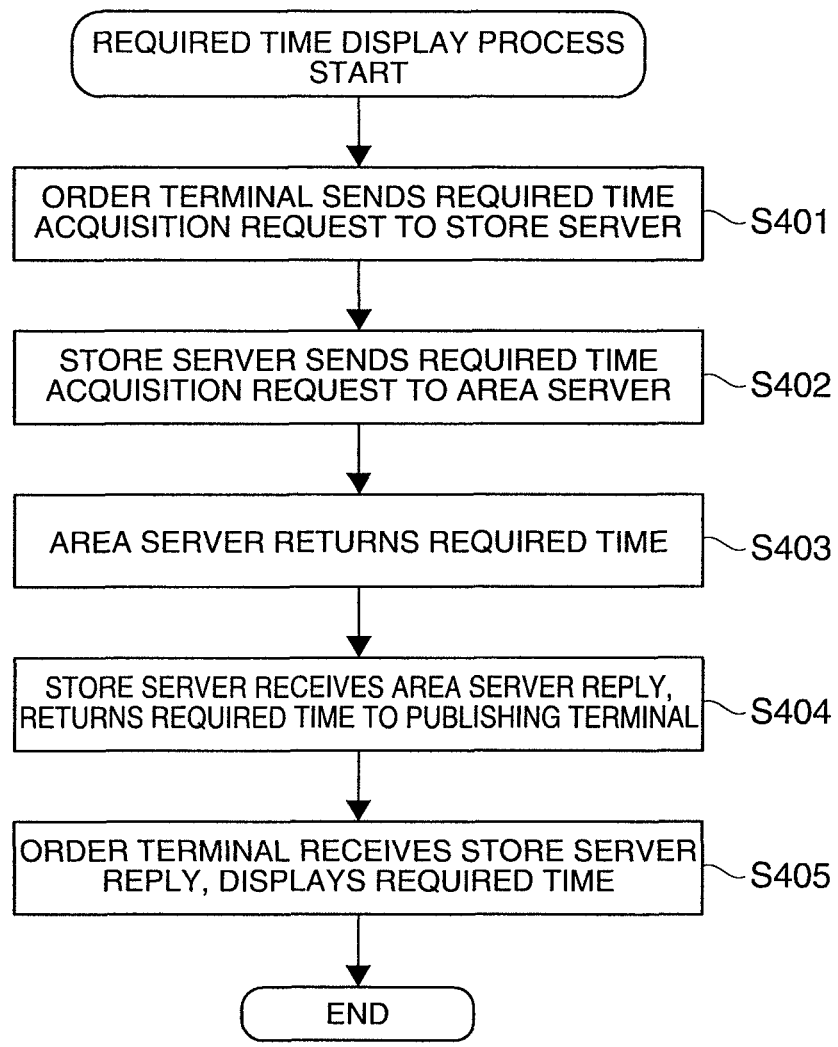
FIG. 9 is a flow chart of a subroutine (required time display process) shown in FIG. 8.

FIG. 9 is a flow chart of the required time display process. When a customer enters a publication request (S301 in FIG. 8), the order terminal 203 sends a required time acquisition request to the store server 202 of the ordering store (S401). The store server 202 receiving this request sends a required time acquisition request to the area server 201 (S402), and the area server 201 returns the required time T2 of each publishing terminal 204 calculated by each store server 202 (S403). When the reply is received from the area server 201, the store server 202 of the ordering store returns the required time T2 to the order terminal 203 (S404), and the order terminal 203 displays the result on the display unit 620 (S405). The store server 202 sends a command requesting required time acquisition to the publishing terminals 204, and each publishing terminal 204 may calculate the required time and return the result to the store server 202.

In order to get the required time T2 from each store server 202 managed by the area server 201, the area server 201 may send a request to each store server 202 whenever an acquisition request is received, or it may regularly query each store server 202 and store the received results internally. Further alternatively, the store servers 202 may report the most recent required time information regularly or whenever conditions change on the store server 202 side.

Figure 10:
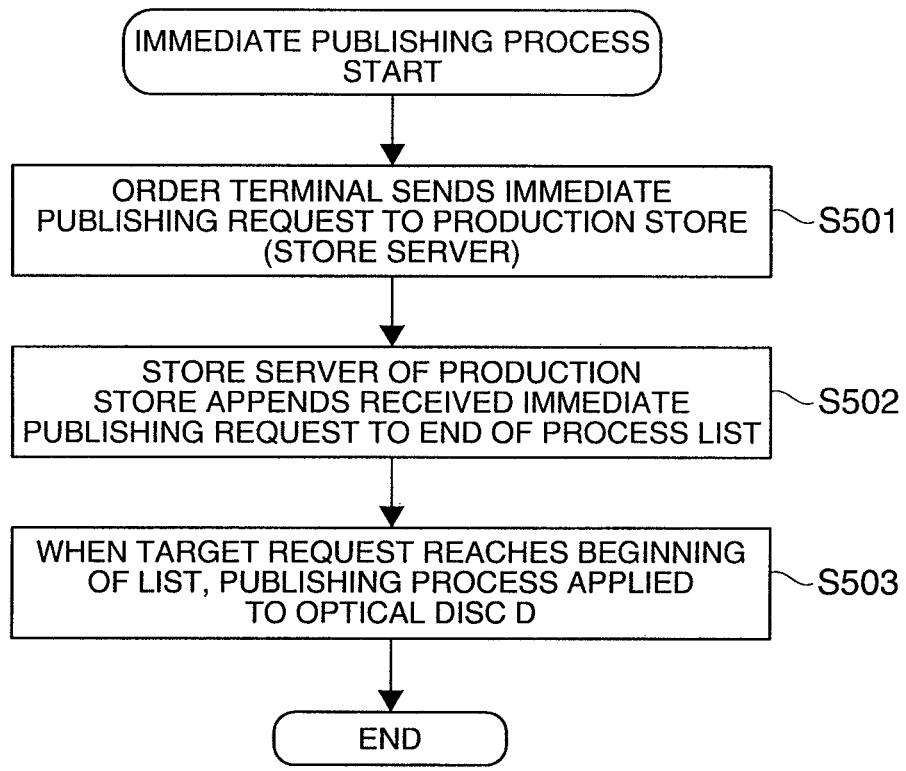
FIG. 10 is a flow chart of a subroutine (immediate publishing process) shown in FIG. 8.

FIG. 10 is a flow chart of the immediate publishing process. If the customer requests same-day receipt of the finished product (see S305 in FIG. 8), the order terminal 203 sends an immediate publication request to the store server 202 in the production store (S501). The store server 202 in the production store adds newly received immediate publication requests to the end of the process list L1 (S502, see the process information storage unit 530 in FIG. 5). When the target request reaches the top of the process list L1, the corresponding optical disc D production process is executed (starts) (S503).

Figure 11:
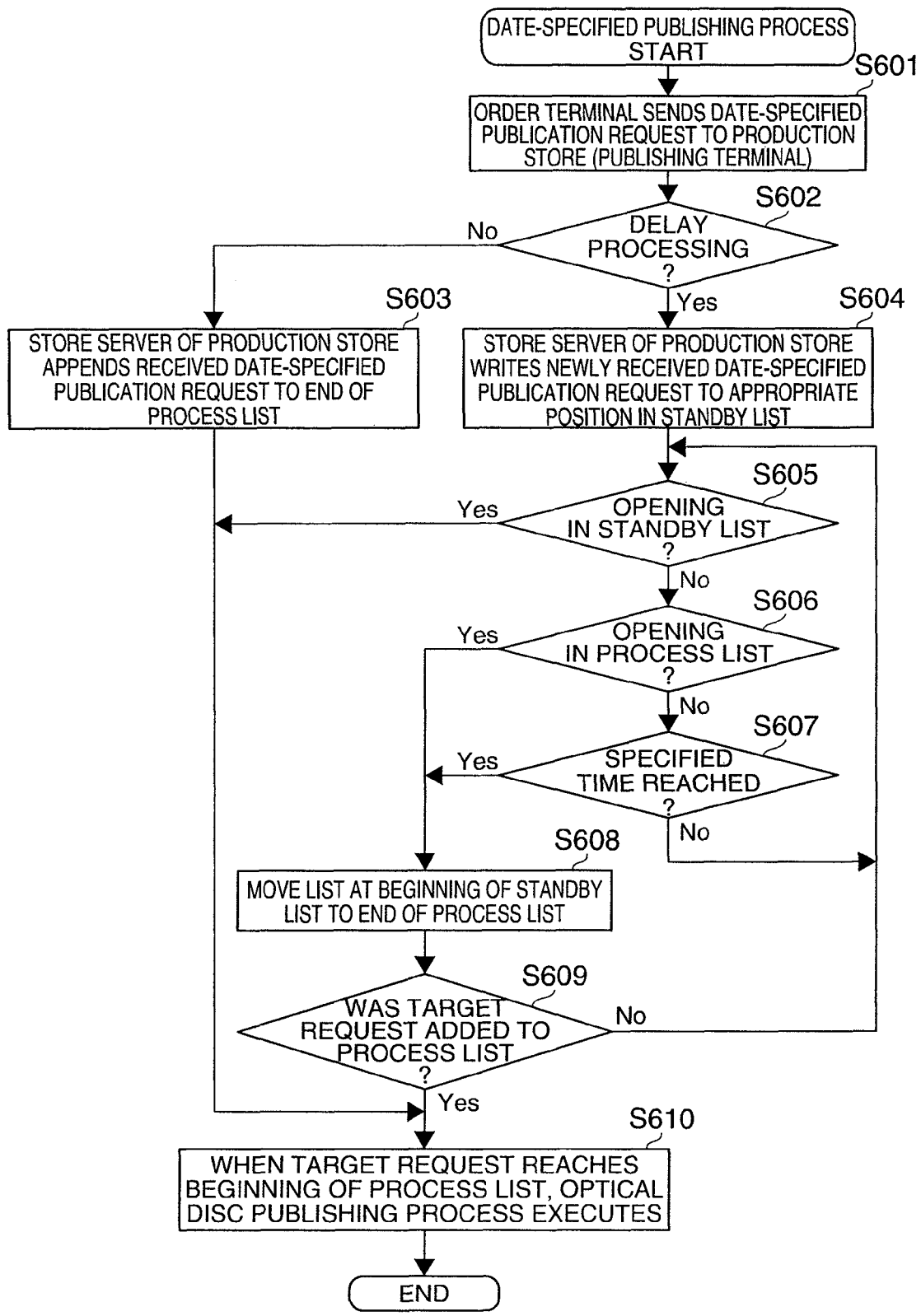
FIG. 11 is a flow chart of a subroutine (reserved time publishing process) shown in FIG. 8.

FIG. 11 is a flow chart of the date-specified publishing process. If the customer does not request same-day receipt of the finished product (see S305 in FIG. 8), the order terminal 203 sends a date-specified publication request to the production store (store server 202) (S601).

The store server 202 in the production store determines whether or not to delay the date-specified publication request based on the received date-specified publication request and the current status of the process list L1 (S602). If there is room to accept at least one new immediate production request before the date-specified publication request, processing should not be delayed (S602 returns No), and the newly received date-specified publication request is added to the end of the process list L1 (S603). When said date-specified publication request reaches the top of the process list L1, the corresponding optical disc D production process is executed (starts) (S610).

However, if there is not room to accept at least one new immediate production request before the date-specified publication request, processing should be delayed (S602 returns Yes), and the newly received date-specified publication request is inserted to an appropriate position in the standby list L2 (S604). Note that the publication requests are chronologically arranged by the requested date and time in the standby list L2.

The store server 202 in the production store then checks the status of the internally stored standby list L2, and checks the status of the process list L1 that is also stored internally if there is at least one request in the standby list L2 (S605 returns No). If at least one request is stored in the process list L1 (S606 returns No), whether the specified time has been reached is determined (S607).

Whether or not the specified time has been reached is determined based either on whether a specific time (such as 12:00 a.m.) has passed and the reserved date has come, or whether there is not enough time left to accept a new immediate production request in order for the reserved order to be completed by the desired date and time.

If the process list L1 is empty (S606 returns Yes), that is, the publishing terminal 204 is in the standby mode, or if the specified time has been reached (S607 returns Yes), that is, it is time to move a publication request from the standby list to the active list, the request at the top of the standby list L2 is removed and added to the end of the process list L1 (S608). Whether the request added to the process list L1 is the target request is determined (S609). If it is the target request (S609 returns Yes), the corresponding optical disc D production process is executed (starts) when the target request reaches the top of the process list L1 (S610).

If it is determined in S607 that the specified time has not been reached (S607 returns No), or it is determined in S609 that the added request is not the target request, the process repeats from S605.

Figure 12:
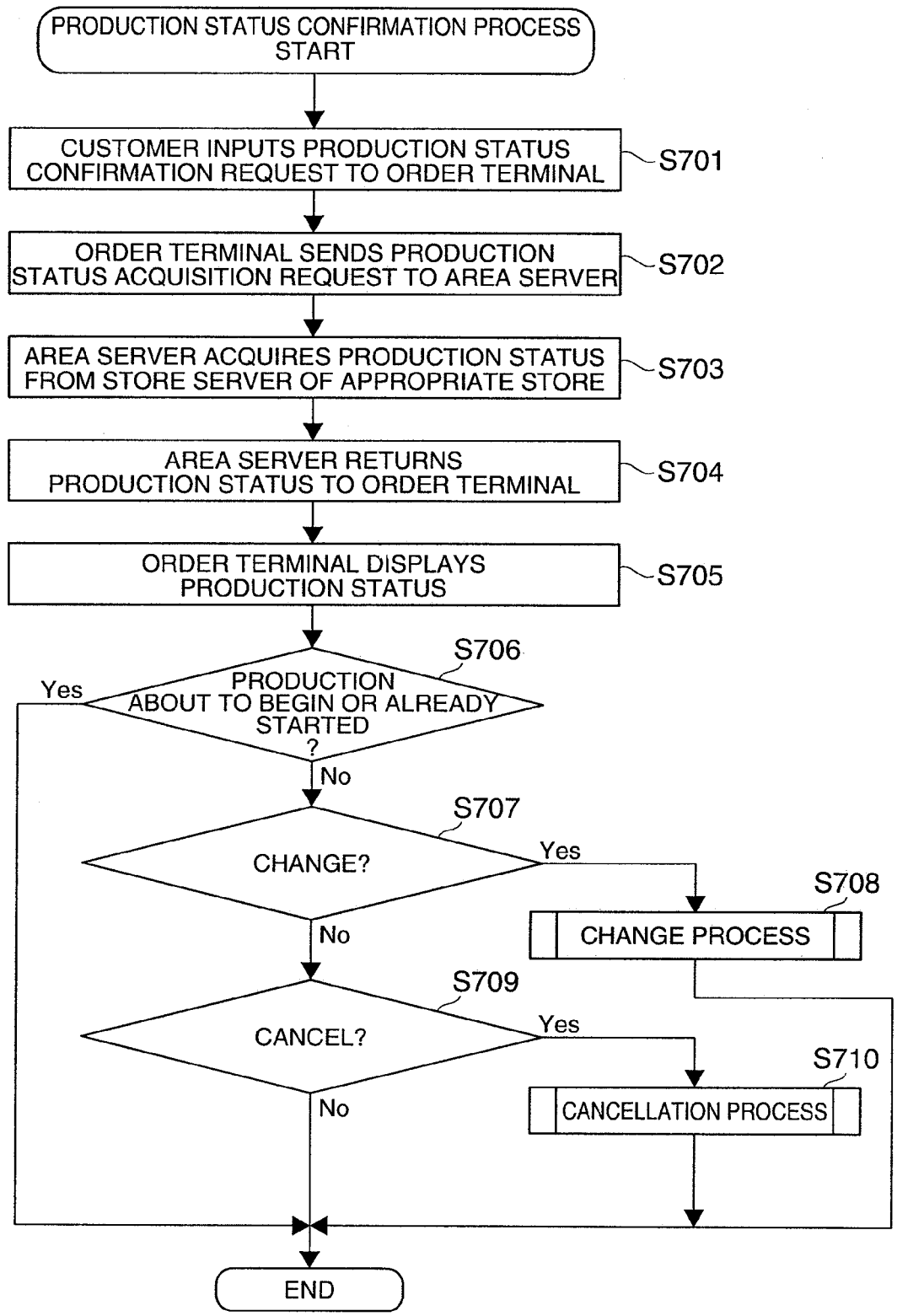
FIG. 12 is a flow chart of the production status confirmation process (main process) of the content publishing system.

A production status confirmation process for confirming the optical disc D production status is described next with reference to the flow charts in FIG. 12 to FIG. 14. FIG. 12 is a flow chart showing the main steps in the process.

As shown in the figure, when the customer inputs a request to check the production status (production completed, production started (production in progress), production to start, or not produced) from the order terminal 203 (S701), the order terminal 203 sends a production status acquisition request through the store server 202 to the area server 201 (S702). The area server 201 receiving the request then acquires the production status from the store server 202 of the corresponding store (production store) (S703), and returns the production status to the order terminal 203 (S704). The order terminal 203 then displays the acquired production status (S705).

If the production status is "production to start" (indicating that production is about to begin) or "production started" (S706 returns Yes), the process ends (order changes and cancellations will not be accepted). If the production status is not "production to start" or "production started" (S706 returns No), whether the customer has requested a change is determined (S707).

Figure 13:
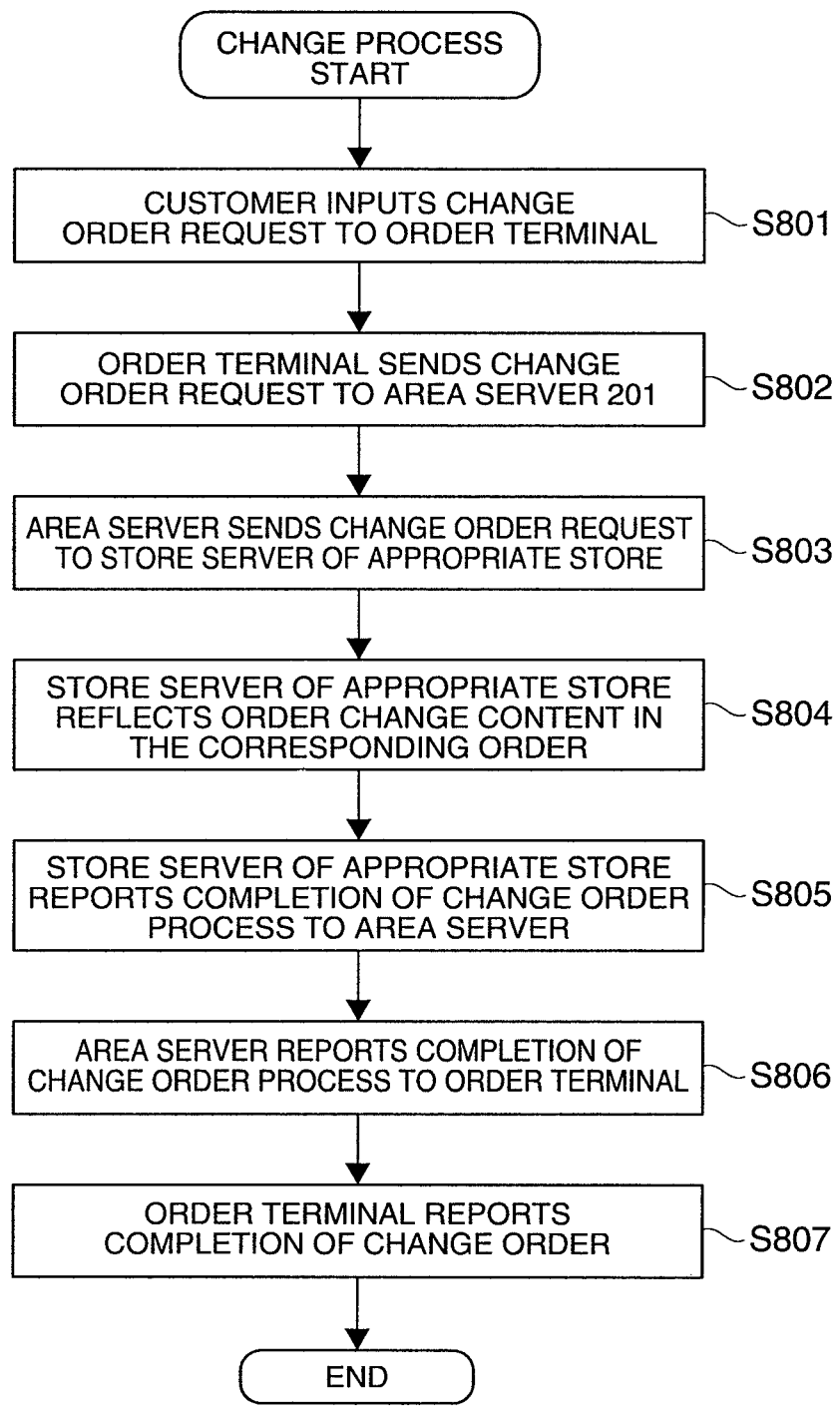
FIG. 13 is a flow chart of a subroutine (change process) shown in FIG. 12.

If a change is requested (S707 returns Yes), a change order process executes (S708, change order process, see FIG. 13). If a change is not requested (S707 returns No), whether the order was cancelled is determined (S709).

Figure 14:
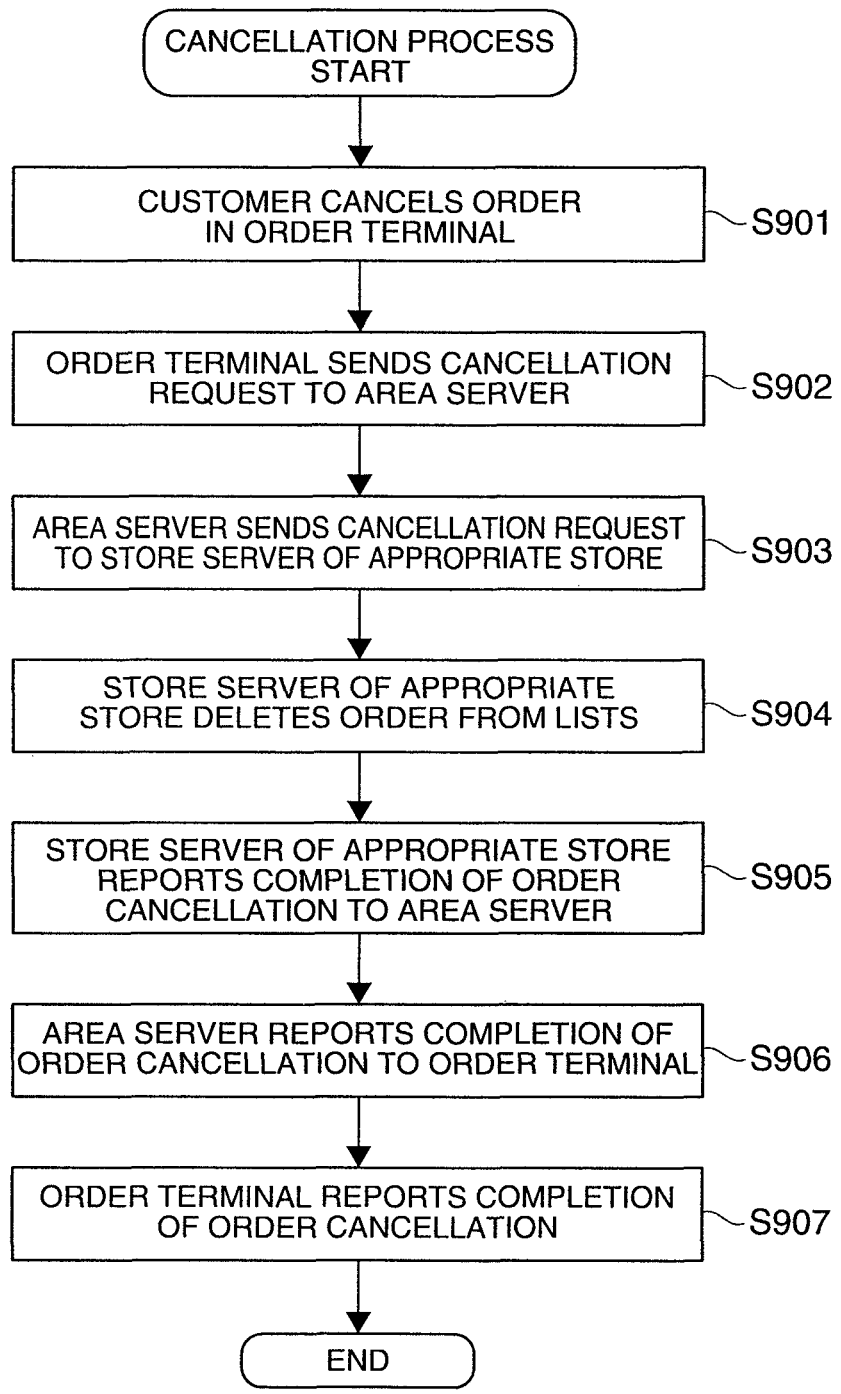
FIG. 14 is a flow chart of a subroutine (cancellation process) shown in FIG. 12.

If the order was cancelled (S709 returns Yes), a cancellation process executes (S710, cancellation process, see FIG. 14). If the order was not cancelled (S709 returns No), the process ends.

Note that the production status may be checked from an outside order terminal 205 instead of an order terminal 203. Furthermore, if the publishing terminal 204 has a function for checking the production status (such as when an operating unit for inputting a production status confirmation request is provided), the request may be entered from the publishing terminal 204. If the production status confirmation request is asserted from the order terminal 203 or publishing terminal 204, the production status may be confirmed without going through the area server 201 (that is, directly from the store server 202).

FIG. 13 is a flow chart of the change order process. If the customer inputs a change to the publication request from the order terminal 203 (S801), the order terminal 203 instructs the area server 201 to change the publication request (S802). When this instruction is received, the area server 201 instructs the store server 202 in the appropriate store (production store) to change the publication request (S803), and the store server 202 reflects the request in the order content (S804). Change requests might change the content ID, production count, requested date/time, printing requirement, recording mode, or printing mode, for example.

The store server 202 in the corresponding store then sends an order change completion report to the area server 201 (S805), and the area server 201 reports completion of the order change to the order terminal 203 from which the request was input (S806). The order terminal 203 then reports completion of the order change to the customer on the display unit 620 (S807).

Note that while not shown in the flow chart, if the order change requests increasing or decreasing the production count, or changing the requested date/time, the cancellation process (see FIG. 14) and the date-specified publishing process (FIG. 11) are executed in S804. In addition, if the production count is increased greatly, the requested date/time is moved up to an earlier time, or the request cannot be accommodated, a message may be displayed telling the customer that the change cannot be processed.

FIG. 14 is a flow chart of the cancellation process. If a customer cancels a publication request through the order terminal 203 (S901), the order terminal 203 instructs the area server 201 to cancel the production order (S902). When this instruction is received, the area server 201 instructs the store server 202 in the appropriate store (production store) to cancel the production order (S903), and the store server 202 deletes the corresponding request from the process list L1 or standby list L2 (S904).

The store server 202 in the appropriate store then reports completion of the cancellation process to the area server 201 (S905), and the area server 201 forwards the cancellation process completion report to the order terminal 203 from which the cancellation request was received (S906). The order terminal 203 then reports completion of the order cancellation to the customer on the display unit 620 (S907).

As described above, because the content publishing system SY according to this embodiment of the invention displays the required time T2 for one or more publishing terminals 204 that can process a publication request received from a customer, the customer can select the publishing terminal 204 to process an order from among the one or more publishing terminals 204 that are displayed. As a result, when a plurality of publishing terminals 204 are connected by a network NT through a franchise contracts, for example, the customer can select the publishing terminal 204 with a short required time (waiting time), and convenience is thus good. An advantage of this system for the store is that the publishing terminals 204 can also be used efficiently.

Furthermore, because the required time T2 is displayed with the location (such as the store name) of each publishing terminal 204, the customer can also use this location information to select an appropriate publishing terminal 204 for processing the order.

Furthermore, because a requested date/time (can input the desired date and time when the finished product can be picked up) can also be specified in the order content, customer waiting time can be eliminated because there is no need for the customer to wait at the same location after entering an order. An advantage of this system for the store is that what would otherwise be publishing terminal 204 idle time can be used efficiently.

Furthermore, because the customer can select whether printing a label is required as part of the order content, orders can be processed as needed or desired by the customer.

Furthermore, because one or more publishing terminals 204 that can be used for production can be extracted according to the order content, including printing requirements, and the operating status information of the publishing terminals 204, the customer cannot mistakenly select a publishing terminal 204 that cannot execute the necessary processes from the order terminal 203.

Furthermore, because a first algorithm and a second algorithm are stored in the algorithm storage unit 510 of the store server 202 (see FIG. 5), the times T1 and T2 that are required to produce the completed discs De can be calculated accurately and easily when a publishing terminal 204 having Drv recording units 20 and one printing unit 30 is operated to maximum efficiency.

In addition, because the publishing terminals 204 operate according to operating algorithms corresponding to the first algorithm and second algorithm, customer waiting time can be shortened and customer convenience can thus be greatly improved.

In the embodiment described above the required time T2 to complete processing the number Req publication request is displayed for the customer in the required time display process (FIG. 9), but the estimated production ending time (the time when processing the Req publication request will be completed) may be presented instead of the required time T2. In this situation the estimated production ending time can be calculated by adding the required time T2 to the current time. This configuration can help prevent mistakes because the customer can directly check the estimated time of completion instead of how much longer production will take.

Yet further, both the required time T2 and the estimated production ending time based on the required time T2 may be displayed instead of only one or the other. Further alternatively, the required time T1 (the processing time for the publication request of a particular customer) or the waiting time Tw (the time until processing the request Req starts) may also be displayed with the required time T2.

The publishing terminal 204 records and prints on the label side of the optical discs D in the foregoing embodiment, but may also print a jacket (an accessory to the recording medium) to cover the optical disc D. This configuration enables customers to purchase finished products with higher added value including printing on the label side and printing a jacket in addition to recording the content. In this configuration the jacket (printed content) is inserted to the case by the store clerk. More specifically, the completed disc De and jacket are inserted to a case before being delivered to the customer as the finished product. Yet further in this configuration, the customer can separately select printing on the label side and printing a jacket as the printing request contained in the order content. In addition, the jacket in this case may be printed by the printing unit 30 or it may be printed using a different printing unit.

The jacket printing time may also be included in the required times T1 and T2. Whether a jacket is printed using the printing unit 30 or using a different printer in this configuration, this configuration can be used effectively to, for example, print advertising or a content guide (an introduction to video content or the lyrics of audio content, for example) as part of the jacket if the time required to print the jacket is comparable to the time required to record the content.

Furthermore, the publishing terminals 204 located in each store are described in the foregoing embodiment as each having two recording units 20 and one printing unit 30, but the number of recording units 20 is not so limited. More specifically, the publishing terminal 204a in store A may have two recording units 20, and the publishing terminal 204b in store B may have four recording units 20, for example. With this configuration the accurate required times T1 and T2 can be calculated according to the configuration of the publishing terminals 204 (the number of recording units 20) located in each store.

Constant parameters in the foregoing embodiment are stored directly in the parameter storage unit 520 (see FIG. 5), but information for determining the parameter values may be stored instead. For example, the transportation path (path length) and the transportation method (transportation pattern), for example, may be stored for the transportation time IN parameter, and the calculation unit 550 may reference a specific algorithm or table to determine the transportation time IN.

Yet further, each store server 202 calculates the required times T1 and T2 of the publishing terminals 204 directly managed by each store server 202 in the embodiment described above (see FIG. 5), but the corresponding components of the store server 202 (the algorithm storage unit 510, parameter storage unit 520, process information storage unit 530, information acquisition unit 540, and calculation unit 550) may be rendered in the area server 201, and the area server 201 may calculate the required times T1 and T2 of all publishing terminals 204 under its management. This configuration reduces the operating load of the store server 202 and reduces the overall construction cost of the system.

The component functions of the store server 202, order terminal 203, and publishing terminal 204 may also be rendered in a single terminal (kiosk terminal). In this situation product assembly is left to the customer. This configuration can also reduce the system construction cost and installation cost because one kiosk terminal could be installed in each store. This configuration also reduces labor costs, and can be expected to reduce the content publishing cost.

One publishing terminal 204 is installed in each store in the embodiment described above, but at least of one embodiment of the invention can also be used when a plurality of publishing terminals 204 are installed in one store. The location information in this situation may be the floor number, sales corner name, or sales counter number, for example.

The functional components of the content publishing system SY according to the foregoing embodiment can also be rendered as a computer-executable program. Said program can also be provided stored on a recording medium such as a CD-ROM, flash memory, or other type of storage device. Yet more specifically, a program that causes a computer to function as the components of the content publishing system SY described herein, and a recording medium storing said program, are also included in the scope of the accompanying claims.

At least of one embodiment of invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A content publishing system publishing content information on an optical disc, comprising:
   an input unit configured to input order content containing a data-specified publication request;
   a publishing terminal that records and publishes the content information on the optical disc; and
   a server comprising a processor and a non-transitory computer readable medium configured to store one or more computer programs, the computer programs including:
   a publishing terminal extraction unit that extracts the publishing terminal from among a plurality of publishing terminals;
   a calculation unit that calculates a required time denoting time required to publish the order content on the publishing terminal;
   an unprocessed information storage unit that stores as unprocessed information the publishing request to be processed by the publishing terminal; and
   a determining unit that determines whether or not to delay a date-specified publication request based on a result of the calculation unit and unprocessed information in the unprocessed information storage unit, wherein when there is room to accept at least one new immediate production request before the date-specified publication request, processing is not delayed, and wherein when there is no room to accept the at least one new immediate production request before the date-specified publication request, processing is delayed and the newly received date-specified publication request is inserted in a standby list;
   wherein the calculation unit determines an optical media processing sequence by each of a plurality of the recording units in the publishing terminal so that a concurrent processing time is increased or an idle times of the plurality of the recording units are decreased, and wherein the calculation unit further calculates the required time needed to publish the order content, when a plurality of recording media are to be produced based on the order content, wherein the optical media processing sequence is determined by measuring at least one of transportation time of the optical media, recording time of the optical media, and removal time of the optical media from the recording unit.

2. The content publishing system of claim 1, wherein the publishing terminal comprises a plurality of recording units having a data recorder and a drive tray for recording the content information on the optical disc.

3. The content publishing system of claim 2, wherein the publishing terminal comprises:
   a printing unit having a printer for printing a label on the optical disc and a printer tray, and
   a stacker that stacks a plurality of optical media.

4. The content publishing system of claim 1, wherein the input unit has a display unit that displays the required time.

5. The content publishing system of claim 4, wherein the server has a location information storage unit that stores location information denoting the location of the plurality of publishing terminals; and wherein the display unit displays the location information of the publishing terminal.

6. The content publishing system of claim 3, wherein the input unit enables inputting order content including a printing requirement related to at least one of printing on the label of the optical media and printing on an optical disc accessory.

* * * * *